United States Patent
Hult et al.

[11] Patent Number: 5,733,351
[45] Date of Patent: Mar. 31, 1998

[54] TWO STAGE VACUUM CLEANER FILTER

[75] Inventors: David R. Hult, St. Peters, Mo.; Donald M. Kolehmainen, Menominee, Mich.; Jeffrey L. Young, St. Peters, Mo.

[73] Assignee: Emerson Electric Co., St. Louis, Mo.

[21] Appl. No.: 689,723

[22] Filed: Aug. 12, 1996

[51] Int. Cl.$^6$ .................................................. B01D 46/52
[52] U.S. Cl. ........................... 55/486; 55/487; 55/498; 55/502
[58] Field of Search .............. 95/286, 287; 55/486, 55/487, 498, 502; 15/347, DIG. 8

[56] References Cited

U.S. PATENT DOCUMENTS

| | | | |
|---|---|---|---|
| 3,209,520 | 10/1965 | McKinlay | 55/498 |
| 3,290,870 | 12/1966 | Jensen | 55/486 |
| 3,365,864 | 1/1968 | Iizima | 55/487 |
| 3,399,516 | 9/1968 | Hough, Jr. et al. | 55/498 |
| 3,838,978 | 10/1974 | Eddleman et al. | 23/292 |
| 4,164,400 | 8/1979 | Wald | 55/487 |
| 4,171,963 | 10/1979 | Schuler | 55/302 |
| 4,185,974 | 1/1980 | Hiester | 55/216 |
| 4,229,193 | 10/1980 | Miller | 55/318 |
| 4,268,289 | 5/1981 | Polaner | 55/498 |
| 4,609,387 | 9/1986 | Berfield et al. | 55/320 |
| 4,619,674 | 10/1986 | Ermannsdorfer | 55/486 |
| 4,619,675 | 10/1986 | Watanabe | 55/498 |
| 4,906,265 | 3/1990 | Berfield | 55/486 |
| 4,917,942 | 4/1990 | Winters | 428/286 |
| 4,976,858 | 12/1990 | Kadoya | 55/486 |
| 5,248,323 | 9/1993 | Stevenson | 95/90 |

*Primary Examiner*—Duane S. Smith
*Attorney, Agent, or Firm*—Arnold, White & Durkee

[57] ABSTRACT

A two stage vacuum cleaner filter is disclosed. The filter includes a first stage outer filter extending in a closed circumferential path with a second stage inner filter located in immediate proximity to and within the first stage outer filter. Sealing elements for securing opposite ends of the first stage outer filter and second stage inner filter to each other are provided. The second stage inner filter stops particles that might leak through the first stage outer filter.

10 Claims, 3 Drawing Sheets

TWO STAGE VACUUM CLEANER FILTER

BACKGROUND OF THE INVENTION

The present invention relates to vacuum cleaner filters, and more particularly, to two stage vacuum cleaner filters having cooperating inner and outer filter elements.

Vacuum cleaners require filters that prevent debris from re-entering the area being cleaned. At the present time, pleated paper filters that are arranged in a closed circumferential path are used for this purpose. Such existing pleated paper filters will stop 99.99% of all particles that are ten microns or larger, provided that the pleated paper filter is free from all production defects, such as tears, holes, proper gluing, etc. Unfortunately, all defects cannot be eliminated in the production process.

Furthermore, when picking up fine dust like fireplace ashes, the existing pleated paper filters allow a puff of dust to discharge into a room being cleaned for several seconds and then the filter re-seals itself. Obviously, any discharge of dust into a room being cleaned is undesirable. Additionally, the existing pleated paper filters allow a steady stream of fine particles (smaller than 10 microns) to flow through such filters.

As will be seen from the discussion that follows, the two stage filter of the present invention includes a first stage outer filter that functions in the same manner as the existing pleated paper filters; however, the present invention further provides a second stage inner filter which stops particles that might leak through the first stage outer filter. As a result, the two stage vacuum cleaner filter of the present invention overcomes many of the aforenoted deficiencies in existing pleated paper filters.

SUMMARY OF THE INVENTION

Among the several objects and advantages of the present invention include:

A new and improved vacuum cleaner filter;

The provision of the aforementioned vacuum cleaner filter which is a two stage high efficiency filter that stops large and small picked up debris from re-entering an area being cleaned by the vacuum cleaner;

The provision of the aforementioned vacuum cleaner filter including a first stage outer filter and a second stage inner filter which are sealed to each other at opposite ends to stop large and small particles from re-entering an area being cleaned;

The provision of the aforementioned vacuum cleaner filter that is constructed to overcome defects in the production process by using outer stage and inner stage filters;

The provision of the aforementioned vacuum cleaner filter that eliminates fine particles smaller than 10 microns from passing through both the outer stage filter and inner stage filter;

The provision of the aforementioned vacuum cleaner filter which is relatively simple in construction; economical; highly efficient; requires modest changes in the production process; and is otherwise well adapted for the purposes intended.

Briefly stated, the vacuum cleaner filter of the present invention includes a first stage outer filter extending in a closed circumferential path including a closed interior path. A second stage inner filter including a circumferential band is positioned within the closed interior path in immediate proximity to the first stage outer filter. Sealing elements are provided for securing opposite ends of the first stage outer filter and second stage inner filter to each other.

The first stage outer filter includes a plurality of adjacently positioned pleats arranged in a closed circumferential path which is preferably a closed cylindrically shaped path. The circumferential band of the second stage inner filter is thus also preferably cylindrically shaped.

Preferably, the first stage outer filter and the second stage inner filter are both made from paper while the sealing elements are made from a foamable elastic material.

Each of the adjacently positioned pleats of the first stage outer filter have at least substantially sealed inner and outer side areas and upper and lower end areas. The circumferential band of the second stage inner filter is positioned in immediate proximity to the inner side areas of each of the adjacently positioned pleats. The circumferential band further includes opposite marginal upper and lower edges which are positioned in proximity to the respective upper and lower end areas of the adjacently positioned pleats. Upper and lower sealing elements are provided for securing the upper and lower edges of the circumferential band to the respective upper and lower ends of each of the adjacently positioned pleats. Each of the upper and lower sealing elements extend across one marginal edge of the circumferential band and one end area of each of the adjacently positioned pleats. Each of the upper and lower sealing elements also extend a predetermined distance inwardly from one marginal edge of the circumferential band as well as from one end of and between the adjacently positioned pleats. Each of the upper and lower sealing elements further include a peripherally extending gasket section for sealing engagement with a vacuum cleaner housing.

These and other objects and advantages of the present invention will become apparent from the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENTS

Figure 1:
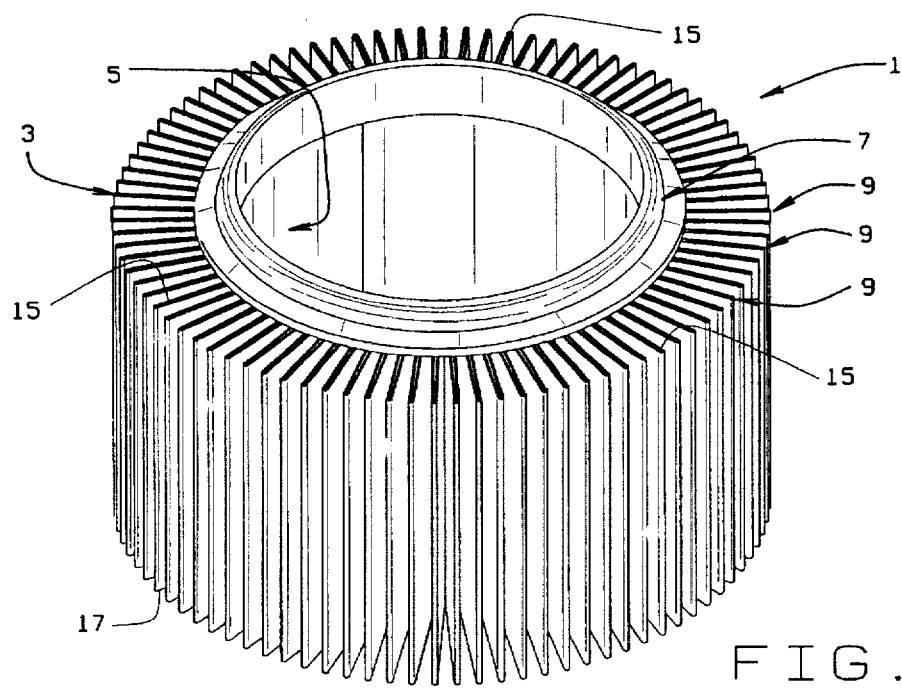
FIG. 1 is a perspective view of the two stage vacuum cleaner filter of the present invention.
Figure 2:
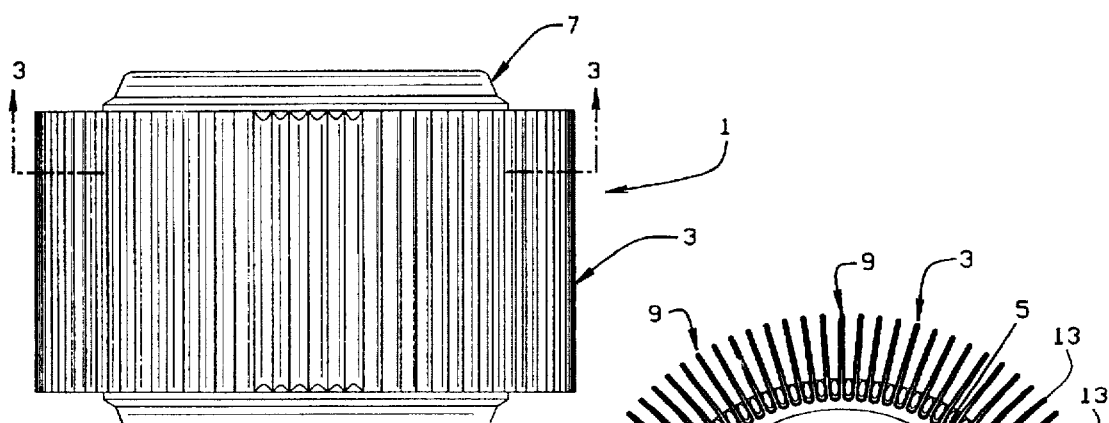
FIG. 2 is a side elevational view of the two stage vacuum cleaner filter shown in FIG. 1.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

The two stage vacuum cleaner filter 1 illustrated in the drawings includes a first stage outer pleated paper filter 3 extending in a closed circumferential path which includes a closed interior path, a second stage inner paper band filter 5 positioned within the closed interior path in immediate proximity to the first stage outer filter 3, and upper and lower sealing elements 7, 7 for securing the opposite ends of the first stage outer filter 3 and second stage inner filter 5 to each other.

The first stage outer pleated paper filter 3 includes a plurality of adjacently positioned pleats 9 that are arranged in the closed circumferential path which is shown to be a closed cylindrically shaped path. The first stage outer pleated paper filter 3 is typically the filter currently being used. Such pleated paper filter stops 99.99% of all particles that are 10 microns or larger, as long as the filter is free of production defects, that is, tears, holes, proper gluing, etc. In this regard, it will be appreciated that each of the adjacently positioned pleats 9 of the first stage outer pleated paper filter 3 have pleated opposite inner and outer side areas 11, 13 as well as opposite upper and lower end areas 15, 17. The inner and outer side areas 11, 13 of each of the adjacently positioned pleats 9 are folded or pleated, while the upper and lower opposite end areas 15, 17 are glued or otherwise adhesively secured together. Unfortunately, it is not possible to eliminate all the defects (tears, holes, proper gluing, etc.) in the production process. As a result, when picking up fine dust, like fire place ashes, the current vacuum cleaner filter and is generally constructed in the form of the first stage outer pleated paper filter 3 only allows a puff of dust to discharge into a room for several seconds before it self seals itself. It also allows a steady stream of fine particles, (smaller than 10 microns) to flow through such pleated paper filter.

In order to provide a two stage high efficiency filter that stops large and small picked up debris from re-entering the area being cleaned, the present invention utilizes a second stage inner paper band filter 5 that is positioned within the closed interior path of the first stage outer pleated paper filter 3 in immediate proximity to the inner side area 11 of each of the adjacently positioned pleats 9. The second stage inner circumferential paper band filter 5 includes opposite marginal edges 19, 19 which are positioned in proximity to the opposite upper and lower end areas 15, 17 oft he adjacently positioned pleats 9.

This enables the pair of upper and lower sealing elements 7, 7 to secure one opposite upper and lower end area 15, 17 to one marginal edge 19 of the paper circumferential band 5 in order to maintain the first stage outer filter 3 and second stage inner filter 5 in sealed and assembled relationship to each other.

Figure 3:
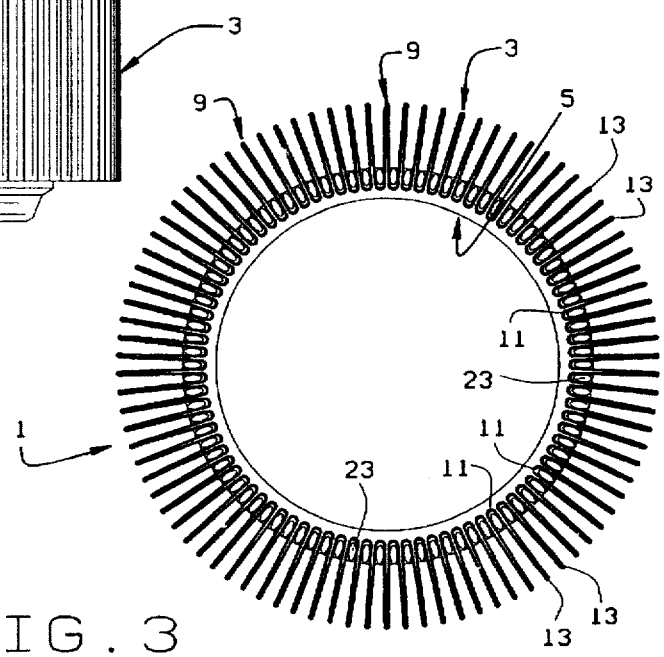
FIG. 3 is a sectional view of the two stage vacuum cleaner filter as viewed along lines 3—3 of FIG. 2.
Figure 4:
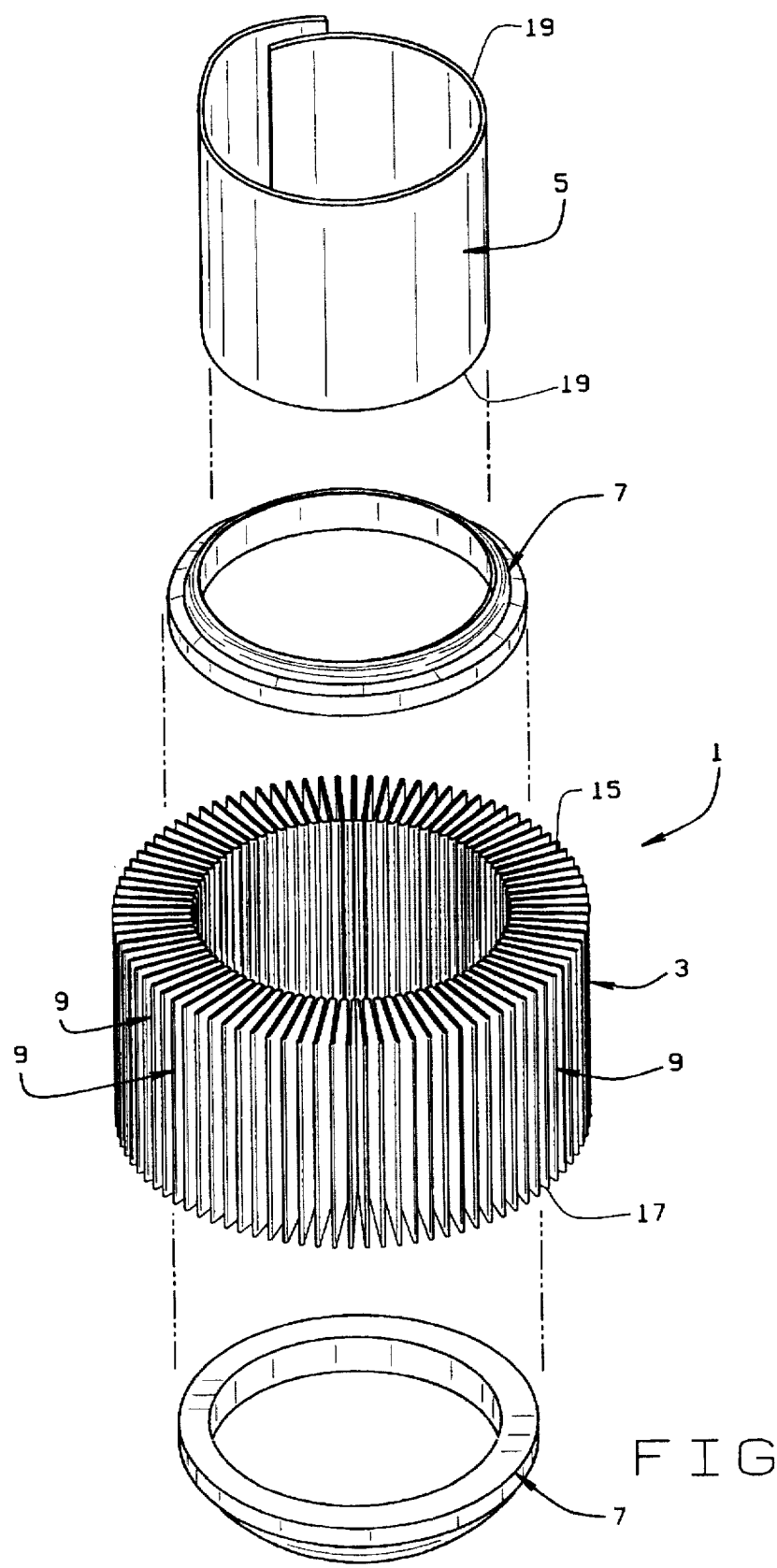
FIG. 4 is an exploded view of the two stage vacuum cleaner filter.
Figure 5:
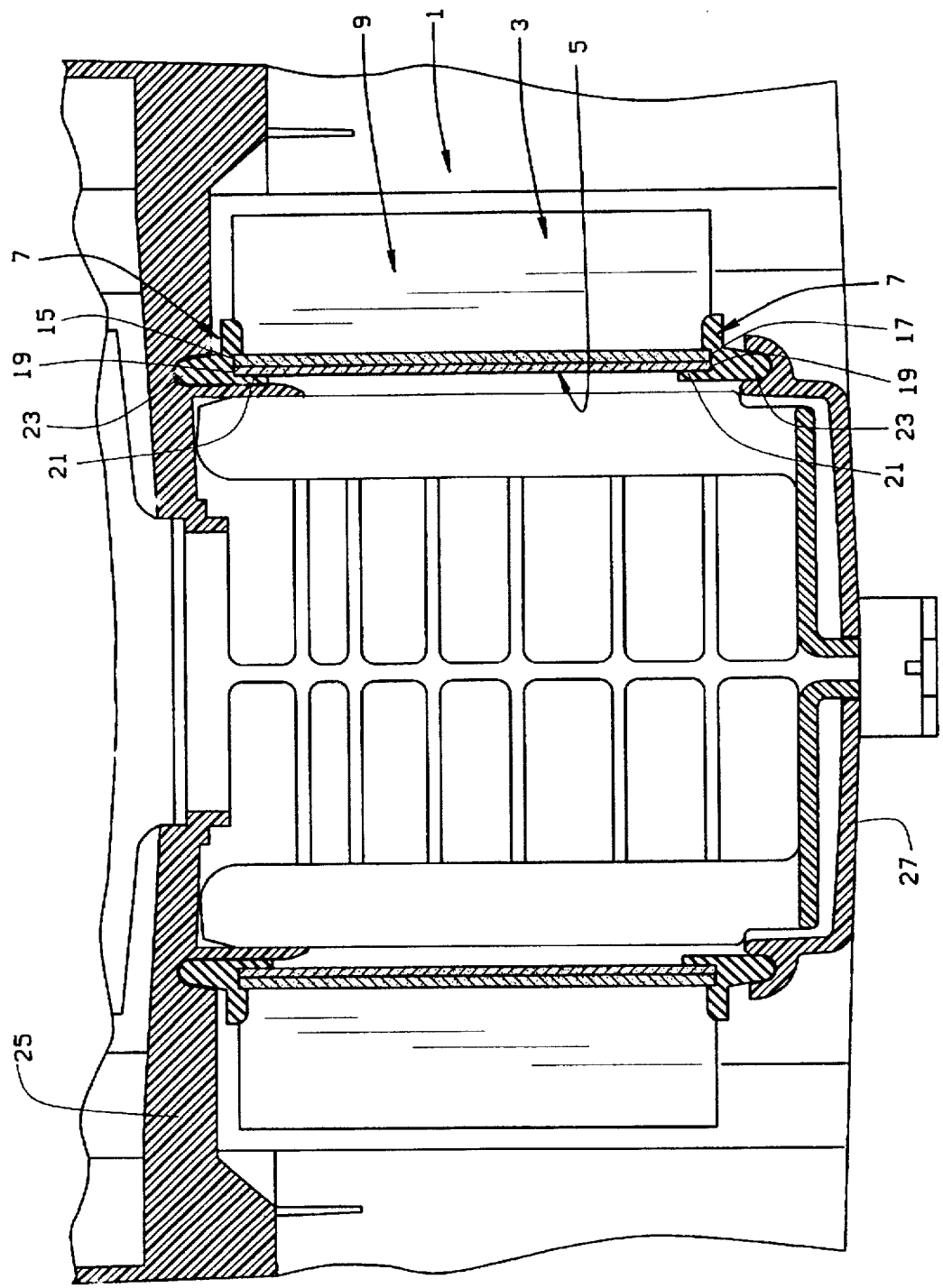
FIG. 5 is a fragmentary sectional view illustrating the environment in which the two stage vacuum cleaner filter of the present invention is typically used.

Each sealing element 7 is preferably an elastomeric foamable material to allow the sealing elements 7, 7 to be formed and secured to the first stage outer filter 3 and second stage inner filter 5. As best illustrated in FIGS. 3 and 5 of the drawings, each sealing element 7 extends across one marginal edge 19 of the paper circumferential band 5 and one upper and lower end area 15, 17 of each of the adjacently positioned pleats 9. Each sealing element 7 also extends a predetermined distance as represented by the numeral 21 along the circumferential band 5 while also extending between each of the adjacently positioned pleats 9 at 23. Thus, each of the sealing elements 7 are capable of adequately securing the first stage outer pleated paper filter 3 and second stage inner circumferential paper band filter 5 to each other.

Each of the sealing elements 7, 7 further include a peripherally extending gasket section 23 for sealing engagement with the vacuum cleaner housing, as shown in FIG. 5 of the drawings.

The typical environment in which a two stage vacuum cleaner filter 1 of the present invention is used is illustrated in FIG. 5 of the drawings. There, it will be seen that the two stage filter 1 is secured in position in a vacuum cleaner housing 25 by removably mounted end cap 27. Other environments for the two stage vacuum cleaner filter 1 may be used, as will be understood.

With a two stage vacuum cleaner filter 1 constructed in the manner described above, the primary or first stage outer pleated paper filter 3 has sufficient capacity to prevent face loading by debris, but unfortunately can be subject to leaks. That is where the second stage inner circumferential band paper filter 5 begins to function. Specifically, the second stage inner circumferential band paper filter 5, while not having much face loading capacity, is protected by the first stage outer pleated paper filter 3 while functioning to stop all small leaks that may get through the first stage outer pleated paper filter 3. As a result, the second stage inner circumferential band paper filter 5 stops all particles that may leak through the first stage outer pleated paper filter 3.

From the foregoing, it will now be appreciated that the two stage high efficiency filter of the present invention stops large and small picked up debris from re-entering an area being vacuum cleaned. The primary or first stage pleated paper filter has sufficient capacity to prevent face loading by debris and the second stage inner paper circumferential band filter stops all leaks that may penetrate the first stage outer pleated paper filter. As a result, the combined effect of the two stage high efficiency filter stops all large and small picked up debris from re-entering an area being vacuum cleaned.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

We claim:

1. A two stage vacuum cleaner filter comprising:
   a first stage outer pleated filter extending in a closed circumferential path which includes a closed interior path;
   a second stage inner filter including a substantially cylindrical circumferential band positioned within the closed interior path in proximity to the first stage outer filter; and
   sealing elements for securing opposite ends of the first stage outer filter and second stage inner filter into substantially fixed proximity relative to each other.

2. The vacuum cleaner filter as defined in claim 1 in which the first stage outer filter includes a plurality of adjacently positioned pleats arranged in the closed circumferential path.

3. The vacuum cleaner filter as defined in claim. 1 in which the closed circumferential path is a closed cylindrically shaped path and the circumferential band is cylindrically shaped.

4. The vacuum cleaner filter as defined in claim 1 in which the first stage outer filter and second stage inner filter are both made from paper.

5. The vacuum cleaner filter as defined in claim 4 in which the sealing elements are made from a foamable elastomeric material.

6. A vacuum cleaner filter comprising:
   a first stage outer filter having a plurality of adjacently positioned pleats arranged in a closed circumferential path which includes a closed interior path, each of said adjacently positioned pleats having at least substantially sealed opposite side and end areas;

a second stage inner filter including a substantially cylindrical circumferential band positioned within the closed interior path in proximity to one side area of each of the adjacently positioned pleats, the circumferential band including opposite marginal edges which are positioned in proximity to the opposite end areas of the adjacently positioned pleats; and a pair of sealing elements each securing one end of the adjacently positioned pleats and one marginal edge of the circumferential band to each other in order to maintain the first stage outer filter and second stage inner filter in assembled relationship to each other.

7. The vacuum cleaner filter as defined in claim 6 in which each sealing element extends across one marginal edge of the circumferential band and one end area of each of the adjacently positioned pleats.

8. The vacuum cleaner filter as defined in claim 7 in which each sealing element also extends a predetermined distance along the circumferential band and between adjacent positioned pleats.

9. The vacuum cleaner filter as defined in claim 8 in which each sealing element further includes a peripherally extending gasket section for sealing engagement within a vacuum cleaner housing.

10. A two stage vacuum cleaner filter comprising:

a first stage outer paper filter having a plurality of adjacently positioned pleats arranged in a cylindrical path, each of said adjacently positioned pleats having at least substantially sealed inner and outer side areas and upper and lower end areas;

a second stage inner paper filter including a substantially cylindrical circumferential band positioned within the cylindrical path in immediate proximity to the inner side areas of each of the adjacently positioned pleats, the circumferential band including opposite marginal upper and lower edges which are positioned in proximity to the respective upper and lower end areas of the adjacently positioned pleats;

upper and lower sealing elements for securing the upper and lower edges of the circumferential band to the respective upper and lower ends of each of the adjacently positioned pleats, each of said upper and lower sealing elements extending across one marginal edge of the circumferential band and one end area of each of the adjacently positioned pleats, each of said upper and lower sealing elements also extending a predetermined distance inwardly form one marginal edge of the circumferential band and from one end of and between the adjacent positioned pleats, and each of said upper and lower sealing elements further including a peripherally extending gasket section for sealing engagement with a vacuum cleaner housing.

* * * * *